3,697,384
FRACTIONATION CONTROL SYSTEM AND PROCESS WITH PLURAL FEED STREAM CONTROLS
Harry L. Walker, Bartlesville, Okla., assignor to
Phillips Petroleum Company
Filed May 12, 1969, Ser. No. 823,699
Int. Cl. B01d 3/42
U.S. Cl. 203—1                             7 Claims

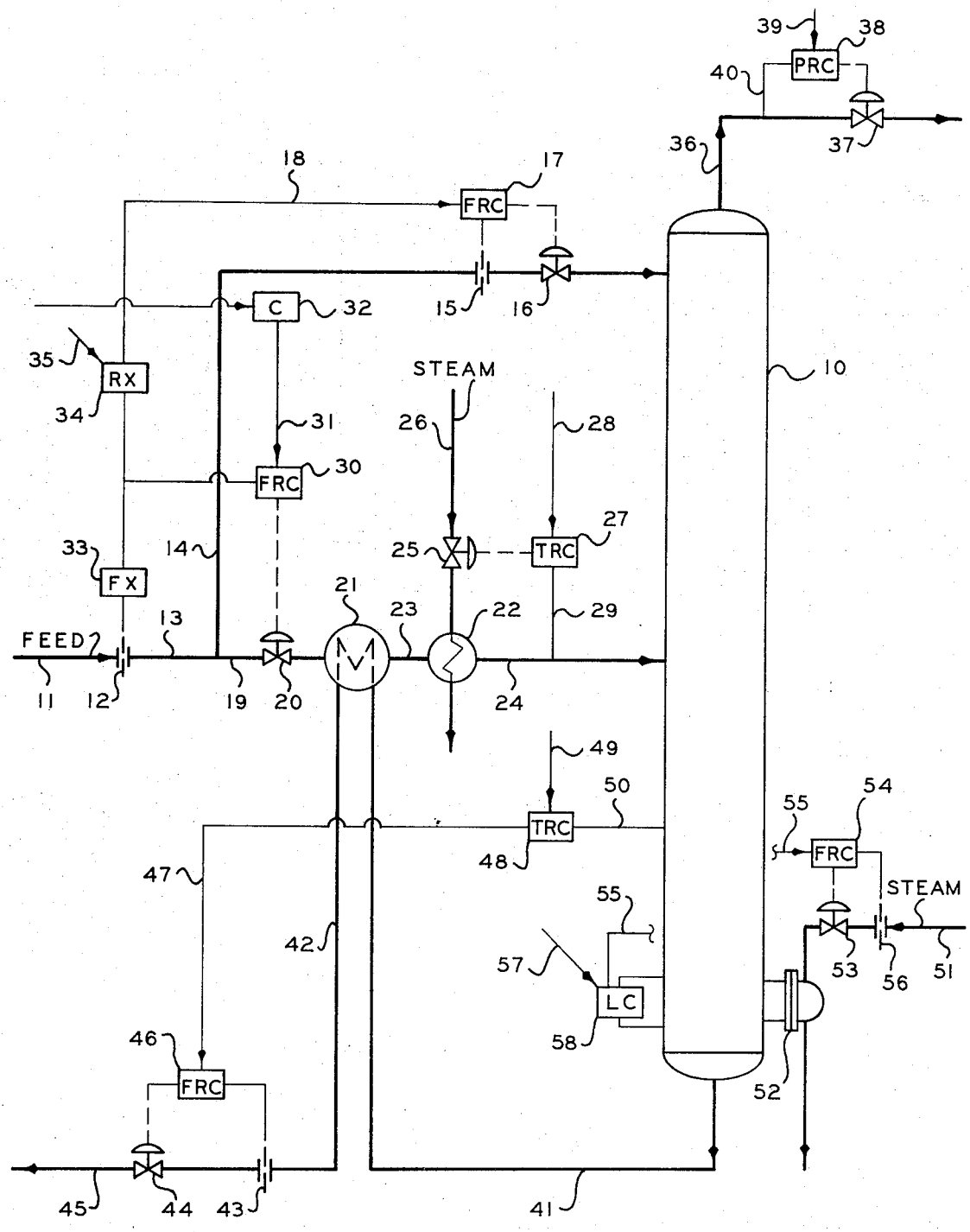

ABSTRACT OF THE DISCLOSURE

Method and apparatus for controlling the fractional distillation of a fluid mixture by separating the total feed stream into two streams, regulating the flow rate of each stream, heating one of the streams, delivering each stream into a distillation column at spaced locations, regulating the flow of fluid from the column, and regulating the temperature within the column.

---

This invention relates to a method and apparatus for the fractional distillation of a liquid mixture. In one aspect, this invention relates to an improved control system for fractional distillation columns. In another aspect, this invention relates to a fractionation process and apparatus employing a split feed stream. In still another aspect, this invention relates to a fractionation process and apparatus in which the column temperature is controlled by the bottoms product flow rate.

Fractionation columns are used extensively in the petroleum and chemical industries to separate fluid mixtures. These columns are provided with a plurality of liquid-vapor contacting surfaces, such as vertically spaced trays. The fluid mixture to be separated is introduced into the column and heat is applied to the lower region of the column to generate a vapor flow. Repeated vaporization and condensation of the feed takes place in the column, and, at each level, the material has a definite composition which is related to the temperature at that point. Of course, the temperature will decrease as the top of the column is approached and the composition becomes progressively stripped of the heavier materials. A vapor stream which is rich in the lighter constituents is removed from the upper region of the column. A kettle product stream which is rich in the higher boiling constituents of the feed mixture is removed from the lower region of the column. Also, in many operation, a side stream is removed from an intermediate portion of said column. In recent years a number of automatic control systems have been devised which are based on environmental or compositional flow measurements.

This present invention relates to an improved control system of this general type, yet also incorporates a novel feed system with automated feed system controlling means. The feed to the column is divided so that a substantial portion is introduced at or near the top of the column, replacing the normal reflux stream, while the remainder of the feed is introduced at an intermediate portion of the column. This feed splitting results in a fractionator which acts in a complex fashion—acting as a stripping column for the feed introduced at the top and as a stripping and rectifying column for the feed introduced at the intermediate portion of the column.

Accordingly, it is an object of this invention to provide an improved controlling system for a fractionation column. Another object of this invention is to provide for stable operation within a fractionation column. A further object is to provide a novel feed and feed controlling system for a fractionation column. Still another object of the invention is to provide for control of column temperature by means of the bottoms product flow rate.

Other objects, advantages, and features of this invention should become apparent from the following detailed description, in conjunction with the accompanying single figure schematic drawing of the apparatus and process.

The drawing is a diagrammatic representation of a fractional distillation system incorporating the control techniques of the present invention. There is shown a fractional distillation column 10 which has upper and lower ends, upper, middle, and lower portions, and a chamber extending therethrough, and is provided with a number of conventional vapor-liquid contacting trays (not shown). A feed stream is passed by way of conduit 11 through a first flow measuring element 12 and through conduit 13 wherein the feed stream is divided into first and second feed streams with said first stream passing by way of conduit 14 through flow measuring element 15 and first valve 16 into column 10. First valve 16 is manipulated by a first flow controller 17 that is responsive to a comparison of the desired flow rate represented by the set point input 18 and the actual flow rate in conduit 14 as determined by the second flow measuring element 15. The second feed stream, formed by the division in conduit 13, passes by way of conduit 19 through second valve 20 and thereafter into and through the first indirect heat exchanger 21. The resulting heated feed stream is then passed into and through a second indirect heat exchanger 22 by way of conduit 23. From the second exchanger 22, the second feed stream passes by way of conduit 24 into a middle portion of column 10. Valve 25, which controls the flow rate of a heating stream passed through conduit 26 into exchanger 22, is manipulated by temperature controller 27 that is responsive to a comparison of the desired temperature of the feed stream as represented by the set point 28 and the actual temperature of the second feed stream in conduit 24 as determined by temperature sensor 29. Second valve 20 in conduit 19 is manipulated by a second flow controller 30 that is responsive to a comparison of the desired flow rate of the total feed stream represented by the set point input 31, which input can be varied based on the action of previous process-step controller 32, and the actual flow rate of the total feed stream as determined by first flow measuring element 12 and transmitted by linearized flow transmitter 33. Controller 32 receives its measurement and set point signals from prior process flow means. Therefore, controller 32 causes a specific total feed stream 11 flow rate to be produced. Linearized flow transmitter 33 also transmits the flow signal to the ratio controller or relay 34 to which is applied a ratio set point 35. The ratio set point governs the flow ratio between the two feed stream conduits. The set point input 18 to first flow controller 17 is produced by ratio controller 34, thus, both valve 16 and valve 20 are manipulated based on the command from controller 32.

An overhead vapor stream is withdrawn from the upper end of column 10 and passed by way of conduit 36 as an overhead vapor product. Valve 37, located in conduit 36, is manipulated by pressure controller 38 responsive to the comparison of the desired pressure in conduit 36 as represented by the set point 39 and the actual pressure in conduit 36 as determined by pressure sensor 40.

A liquid bottoms stream is withdrawn from the lower end of column 10 by way of conduit 41 into the first heat exchanger 21 wherein a portion of the heat content of the bottoms stream is utilized for heating the second feed stream passing through first exchanger 21. The liquid bottoms stream is withdrawn from first exchanger 21 by way of conduit 42 and is then passed through a third flow measuring element 43 and a third valve 44. The bottoms stream is then withdrawn from the system by way of conduit 45 as a cooled liquid bottoms product stream. Third valve 44, which controls the flow of liquid bottoms product from the system, is manipulated by third flow controller 46 responsive to a comparison of the desired flow rate represented by the set point input 47 and the actual flow rate as determined by third flow measuring element 43. The set point input 47 to third flow controller 46 is manipulated by temperature controller 48 responsive to a comparison of the desired temperature at a specific point between two given trays represented by set point 49 and the actual temperature at this point as determined by temperature sensor 50.

The flow of steam through conduit 51 to reboiler 52 is controlled by fourth valve 53 which is manipulated by fourth flow controller 54 responsive to a comparison of the desired flow rate represented by the set point input 55 and the actual flow rate in conduit 51 as determined by fourth flow measuring element 56. The signal to set point input 55 is received from liquid level controller 58 responsive to a comparison between the desired liquid level in the lower portion of column 10 as represented by set point 57 and the actual liquid level as sensed by the controller 58.

So, the reboiler system and the bottoms product system function in conjunction to maintain a desired temperature at sensor 50 in the column, said temperature being predetermined by set point 49 of temperature controller 48. Thus, if the temperature as determined by temperature sensor 50 becomes less than that of set point 49, the temperature controller 48 modifies its signal applied to set point input 47 of the third flow controller 46. Controller 46 then compares this new set point input with the actual flow through third flow measuring element 43. In this instance, controller 46 will then adjust third valve 44 to a more closed position thereby allowing a smaller flow to pass as bottoms product. This adjustment will begin to raise the liquid level in the lower portion of the column. When the level becomes somewhat higher than desired, as specified by set point 57, the level controller will transmit a signal to set point input 55 of fourth flow controller 54 which then will adjust valve 53 to cause a higher flow rate of steam to pass in to reboiler 52, thereby increasing the rate of vaporization of the reboiler liquid. This reduces the liquid level causing a decrease in concentration of the lighter components in this section of the column, and thereby raising the temperature at sensor 50, so that it more closely corresponds to the predetermined value represented by set point 49.

Of course, the opposite action will occur if the temperature at 50 is greater than the desired value at set point 49. In order to maintain records of the operation of this control system, the first, second, third, and fourth flow controllers can be flow-recorder controllers and the temperature controller can be a temperature-recorder controller.

Thus, the column temperature is controlled by the flow rate of bottoms product which in turn controls the heat input to the reboiler.

The employment of the novel feed and feed control system serves to promote greater stability in the column by automatically adjusting for varying feed rates, feed compositions, and feed temperature. Thus, at all times the flows in the two feed lines correspond to the prescribed ratio as represented by set point 35 and also the temperature of the feed entering the middle portion of the column will always correspond to the desired temperature as represented by set point 28.

This novel feed system functions as follows: Feed enters by way of conduit 11, whereupon it passes through first flow measuring means 12 which is operatively connected to flow transmitter 33. Thus, the flow rate value is transmitted by 33 to ratio controller 34 and to flow recorder controller 30. The ratio controller 34 has incorporated a ratio set point 35 which determines what percentage of the total feed stream will pass through conduit 14 and into the upper portion of the column. For example, set point 35 might be 0.45. Thus, 45% of the feed is to pass by way of conduit 14. So the ratio controller 34 multiplies the set point by the total flow rate received from flow transmitter 33 to determine the desired flow rate that should pass to the column 10 by way of conduit 14. This desired flow rate is applied as set point input 18 to flow recorder controller 17. Controller 17 then compares the desired flow rate as represented by the set point with the actual flow rate as received from second flow measuring means 15 and transmits a signal to first valve 16 which adjusts the valve to the proper opening to bring the actual flow rate to the value of the desired flow rate. So, even though the total flow rate through first flow measuring element 12 may vary, ratio controller 34 in combination with flow recorder controller 17 insures that the proper proportion of feed is passing to the upper section of the column, the balance of the feed being applied to the intermediate feed tray. As mentioned above, flow recorder controller 30 also receives a signal from flow transmitter 33. This signal, which represents the actual flow through first flow measuring element 12, is compared with set point input 31, received from controller 32. Thus, when controller 32 receives a signal that the total feed input through conduit 11 is to increase significantly, this new condition becomes the new set point input value on flow recorder controller 30 which then compares this value with that of the actual flow. Since the set point value is now greater, controller 30 manipulates second valve 20 to a more open position and thus permits a greater flow rate. Of course, the opposite action will occur when the signal to controller 32 commands that the total feed input through conduit 11 decrease. Naturally, when the flow does increase or decrease, the control means for that portion of the feed passing by way of conduit 14 will, as previously explained, be simultaneously adjusted and thereby maintain a constant feed ratio to the upper section of the column.

In addition, the control means for the feed stream passing to the middle portion of the column includes heat exchangers 21 and 22 for raising the temperature of the feed in this conduit to the desired value as designated by set point 28. Thus, regardless of the initial temperature of the second feed stream the heat exchanger control means will insure that the temperature of the second feed stream entering column 10 by way of conduit 24 is always at the desired temperature. Also, since the composition of the total feed stream may vary or the temperature of the first feed stream in conduit 14 may vary, it will no doubt be necessary to adjust the set point 28 to compensate for these changes, thereby insuring that heat input by way of the feed entering the column through conduit 24 is at the optimum value for effective operation of the column.

The splitting of the total feed into first and second feed streams, with the heating of the second feed stream before it reaches the column, serves another novel and important purpose. It promotes stability in the column by distributing the heat load operably throughout the column and thereby the problem of flooding, which could occur at high production rates when the feed is introduced at only one location was alleviated. Thus, as the liquid above the second stream feed location (primarily from the first feed inlet) passes downwardly, it is contacted by the combination of the vapor from the second stream feed and the vapor from the reboiler. This combination will sufficiently heat a portion of this lower boiling liquid and thereby vaporize it. So the splitting of the total feed with the second feed stream being heated, allows more feed to be introduced into the fractionator per unit of time and also distributes the liquid load throughout the column so that the tendency for flooding to occur in the lower portion of the column is minimized.

An example of the use of this inventive concept for the separation of a mixture of hydrocarbons by a fractionating column and control means previously described is related below. A column having a diameter of 10 feet and 15 trays was employed to process a feed comprising cyclohexane, a methane, and hydrogen. A material balance was calculated for every 457.0 mols of feed.

| Material | Total feed | Feed tray No. 7 | Feed tray No. 15 | Overhead product | Bottoms product |
|---|---|---|---|---|---|
| $H_2$ | 2.0 | 1.1 | 0.9 | 2.0 | |
| $C_1$ | 27.0 | 14.9 | 12.1 | 27.0 | Trace |
| Cyclo-$C_6$ | 428.0 | 236.0 | 192.0 | 1.4 | 426.6 |
| Total | 457.0 | 252.0 | 205.0 | 30.4 | 426.6 |

The feed was divided so that 55% was introduced in an intermediate region of the column at 300° F., while the remaining 45% was introduced in the upper region of the column at 100° F. Note that the only liquid introduced into the upper region of the column is the feed through this conduit. The reflux system generally utilized with fractionating columns is not employed in this inventive concept. The temperature in the columns which was controlled by the bottoms product stream, the reboiler system, and the control means associated therewith was measured between the sixth and seventh trays and the set point temperature at this location was 353° F.

The results from this example clearly show that this inventive system effectively separated the hydrocarbon mixture, and, what is more, the column was operating at a high feed rate and yet did not suffer from the flooding problems that had previously plagued the process when the column was fed at only one location and the particular combinations of control means were absent. The statement is substantiated by experimental data which shows that, using the inventive feed system, the liquid in the column is much more uniformly distributed on all trays and therefore is not as susceptible to flooding.

Thus, for two feed streams with this feed rate, only 298 mols of liquid were on the bottom tray, whereas near flooding conditions existed on the bottom tray (523 mols of liquid) of the conventional column having a feed entry at only one location. Thus, the splitting of the feed in combination with the heating means utilized with the intermediate feed system results in a smoothly running column at high production rates and at high efficiency.

Various modifications and alterations of this invention will become apparent to those skilled in the art from the foregoing discussion, example, and accompanying drawing, and it should be understood that this invention is not to be unduly limited thereto.

That which is claimed is:

1. Controlled fractional distillation of a hydrocarbon stream within a fractional distillation column, comprising:
   means for separating a total feed stream into first and second feed streams relative to each other;
   a first flow-measuring means within the total feed stream for measuring the flow rate of the total feed stream entering the system;
   a flow-rate transmitter connected to the first flow-measuring means adapted to deliver a signal representative of the stream flow rate therethrough;
   a ratio controller connected to the output of the flow rate transmitter and being adapted to deliver a signal responsive to a multiplication of the signal received from the flow rate transmitter by a preset flow rate;
   a second flow-measuring means within the first feed stream for measuring the flow rate of said stream;
   a first flow controller connected to the second flow-measuring means and the output of the ratio controller and being adapted to deliver a signal responsive to a comparison of the flow rate through the second flow-measuring means and the flow rate through the first flow-measuring means;
   a first valve within the first feed stream connected to and operated by the signal from the first flow controller for regulating the rate of flow of the first feed stream;
   a second flow controller having a set point and being connected to the flow-rate transmitter for receiving a signal from the flow-rate transmitter, comparing said signal to the set point and delivering a signal in response to said comparison;
   a second valve within the second feed stream connected to the second flow controller for receiving the signal therefrom and controlling the flow rate of the second feed stream in response thereto;
   a heat exchanger within the second feed stream for heating said second feed stream to a preselected temperature; and
   a fractional distillation column having upper and middle portions and a lower reboiling portion connected at its upper portion to the first feed stream and at its middle portion above the lower reboiling portion to the heated second feed stream for the fractional distillation of the feed streams therein.

2. Control apparatus, as set forth in claim 1, including:
   a second heat exchanger connected to the discharge of the first heat exchanger for heating the second feed stream to a preselected temperature;
   a bottoms stream conduit connected to the lower portion of a column and the first heat exchanger for passing heated liquid from the column through the heat exchanger; and
   control means for regulating the flow rate of said bottoms stream in response to the temperature of the column.

3. Control apparatus, as set forth in claim 1, including:
   a reboiler attached to the lower portion of the column; and
   control means attached to the reboiler for controlling the passage of fluid thereinto and therefrom in response to a comparison of the flow rate of the fluid passing into the reboiler and a set point.

4. An apparatus, as set forth in claim 1, wherein the first flow controller is a recorder-controller and the second flow controller is a recorder-controller.

5. A method for controlling fractional distillation of a hydrocarbon stream, comprising:
   separating the total feed stream into first and second feed streams;
   regulating the flow of the first feed stream into an upper portion of a distillation column in response to the flow rate of the total feed stream entering the system, a desired preset flow rate ratio, of the first feed stream to the total feed stream, for the first feed stream, and the flow rate of the first feed stream;
   delivering the first feed stream into an upper portion of the distillation column;
   regulating the flow of the second feed stream into a middle portion of the column in response to the flow rate of the total feed stream entering the system and a desired preset flow rate of the second feed stream; withdrawing an overhead vapor stream from the upper end of the column; and
   withdrawing a liquid bottoms stream from the lower end of the column.

6. A method, as set forth in claim 5, including heating the second feed stream to a preselected temperature and regulating the flow of the liquid bottoms stream from the lower end of the column in response to the temperature within the column, a desired preset temperature, and the flow rate of the liquid bottoms stream from the lower end of the column.

7. A method, as set forth in claim 5, including maintaining the pressure within the column by said withdrawal of light fractions from the upper end of the column and regulating the flow of steam into a reboiler of the column in response to the liquid level within the column, a desired preset liquid level, and the steam flow rate into said reboiler.

References Cited

UNITED STATES PATENTS

| | | | |
|---|---|---|---|
| 2,767,133 | 10/1956 | Shobe | 203—1 |
| 2,900,312 | 8/1959 | Gilmore | 202—160 |
| 3,150,064 | 9/1964 | Dobson | 203—Dig. 18 |
| 3,230,154 | 1/1966 | Walker | 203—Dig. 18 |
| 3,271,269 | 9/1966 | Walker | 203—2 |
| 3,294,648 | 12/1966 | Lupfer et al. | 203—2 |
| 3,309,287 | 3/1967 | Lupfer et al. | 203—1 |
| 3,420,748 | 1/1969 | Johnson et al. | 203—1 |
| 3,442,767 | 5/1969 | Hall | 203—Dig. 18 |

FOREIGN PATENTS

| | | | |
|---|---|---|---|
| 740,014 | 10/1943 | Germany | 202—206 |

WILBUR L. BASCOMB, JR., Primary Examiner

U.S. Cl. X.R.

196—132; 202—160, 206; 203—2, Dig. 9, Dig. 18